United States Patent [19]

Walker et al.

[11] 4,287,463
[45] Sep. 1, 1981

[54] ZERO ROTATION AND ZERO TORQUE DETECTOR AND METHOD FOR AN AC ELECTRIC MOTOR DRIVE

[75] Inventors: Loren H. Walker, Salem; John H. Cutler, Roanoke, both of Va.

[73] Assignee: General Electric Company, Salem, Va.

[21] Appl. No.: 32,855

[22] Filed: Apr. 24, 1979

[51] Int. Cl.³ .............................................. H02P 5/00
[52] U.S. Cl. ..................................... 318/803; 363/37; 363/58; 318/798
[58] Field of Search ............................... 318/798–803, 318/805, 807–812; 363/37, 55–58

[56] References Cited

U.S. PATENT DOCUMENTS

| | | | |
|---|---|---|---|
| 3,852,656 | 12/1974 | Bourbeau | 363/58 |
| 4,151,586 | 4/1979 | Udvardi-Lakos | 363/57 |
| 4,208,691 | 6/1980 | Rogowsky | 363/56 |
| 4,237,531 | 12/1980 | Cutler et al. | 318/798 |

Primary Examiner—J. V. Truhe
Assistant Examiner—John B. Conklin
Attorney, Agent, or Firm—Arnold E. Renner

[57] ABSTRACT

A substantially zero rotation and substantially zero torque detector and method for an AC electric motor drive system includes an AC electric motor producing a rotation in response to an outgoing signal, e.g., drive current, of variable magnitude and frequency. An actual rotation signal is generated and is proportional to the rotation of the AC electric motor or to the frequency of the outgoing signal. A rotation reference signal proportional to a desired level of rotation is established. A rotation difference signal representative of any difference between the rotation reference signal and the actual rotational signal is generated. A torque command signal is provided as a function of the rotation difference signal and is used to produce a frequency control signal and a current control signal. Alternatively, the torque command signal is generated proportional to a desired level of torque when the drive system utilizes a desired torque level as opposed to a desired rotation level. The outgoing signal, for example, the drive current, is supplied to the motor at a frequency controlled in response to the frequency control signal and at a magnitude varied in accordance with the current control signal. In the case of a drive system utilizing a desired level of rotation, the substantially zero rotation and substantially zero torque detector and method furnishes an idle control signal when the torque command signal and at least two of the rotation reference signal, the actual rotation signal, and the rotation difference signal are less than respective predetermined values. Alternatively, in the case of a drive system utilizing a desired level of torque, the substantially zero rotation and substantially zero torque detector and method furnishes an idle control signal when the actual rotation signal and the torque reference signal are less than respective predetermined values. In either case, the idle control signal is effective to control an operation parameter or function of the drive system and indicates when the drive system is in the substantially zero rotation and substantially zero torque mode.

21 Claims, 3 Drawing Figures

ZERO ROTATION AND ZERO TORQUE DETECTOR AND METHOD FOR AN AC ELECTRIC MOTOR DRIVE

BACKGROUND OF THE INVENTION

1. Field of the Invention

The present invention relates generally to AC drive power conversion systems and, more particularly, to a substantially zero rotation and substantially zero torque detector and method for an AC electric motor drive system for producing an idle control signal when the drive system is in the substantially zero rotation and substantially zero torque mode.

2. Prior Art

Direct current (DC) motors have traditionally been used in electric drive systems to produce a mechanical rotation over a variable rotation range at substantial torque levels. However, DC motors exhibit several major deficiencies, including high maintenance costs and radio frequency interference problems caused by arcing and concomitant mechanical deterioration of the brushes used in such motors.

The trend in recent years has been to use AC motors in electric drive systems which produce variable mechanical rotation of substantial torque. AC motors are attractive technically and commercially because of their lack of brushes and inherent ruggedness of design.

An excellent analysis of the theory and operation as well as the attributes and deficiencies of DC and AC motor types is found in *Electrical Machinery, the Processes, Devices and Systems of Electromechanical Energy Conversion*, 3d Ed., by A. E. Fitzgerald et al., McGraw-Hill Book Company, New York, 1971.

One type of AC motor is the AC induction motor. The AC induction motor has been used in AC drive power systems for producing a variable mechanical rotation of substantial torque.

In such drive systems, the AC induction motor produces a variable mechanical rotation of variable torque in response to an output signal, such as a current, of variable magnitude and frequency. This drive current is typically supplied from a variable frequency inverter. The inverter converts a DC current of controllable magnitude into the drive current of variable magnitude and frequency; in the case of the thyristor inverter, the drive current is generated as a result of the controlled gating of the thyristors. The inverter typically has commutating capacitors used to commutate automatically the thyristors. This automatic commutation produced by the commutating capacitors requires a charge of appropriate magnitude and polarity on each commutating capacitor.

The DC current of controllable magnitude provided to the inverter can be supplied from any DC current source, but typically is furnished by a DC converter via a DC link having an inductor.

A conventional drive system utilizing an AC induction motor typically can provide substantially zero rotation at substantial torque. One way this can be accomplished is by operating the induction motor in a "constant slip" mode. It is sufficient for present to state that per-unit slip s is expressed as $s = (n_1 - n)/n_b$, where n is the rotation produced by the rotor of the motor in revolutions per minute (rpm), $n_1$ is the synchronous speed of the stator field of the motor in rpm, and $n_b$ is the synchronous speed of the stator field at the motor rated rpm. In this regard, reference is made to pages 188-189 of the Fitzgerald, et al reference presented above. As is apparent, the per-unit slip increases towards the maximum value of 1.0 as the rotation of the rotor decreases with respect to the synchronous speed of the stator field.

In addition to the substantially zero rotation at substantial torque mode of operation, it is desirable for the drive system utilizing an AC induction motor to be able to provide substantially zero rotation at substantially zero torque. Most AC motor control schemes fail to operate properly at this latter condition. One approach to accomplish this latter mode of operation is for the drive system to force the frequency of the drive current to a substantially zero value and to force its magnitude to a predetermined lower level. This approach is described in detail in U.S. patent application Ser. No. 032,856, "Apparatus and Method For Providing A Signal Porportioned to Flux In An AC Motor For Control of Motor Drive Current", by John H. Cutler and Loren H. Walker, filed the same day as the present invention, assigned to the assignee of the present invention and incorporated herein by reference. Other approaches can be used for causing the AC induction motor to provide substantially zero rotation and substantially zero torque.

In order to utilize the approach as is set forth in application Ser. No. 032,856 referenced above, it is desirable to develop an idle signal when substantially zero rotation and substantially zero torque exit. Such an idle control signal could be used in improved drive systems to effect control of desired system parameters and functions such as switching to some means for determining motor flux other than that utilized during motor rotation. Consequently, it would be advantageous for an idle control signal to be generated when a drive system is in a substantially zero rotation and substantially zero torque state.

OBJECTS OF THE INVENTION

It is an object of the present invention to provide an apparatus and method for detecting when a substantially zero rotation and substantially zero torque condition is present in an AC electric motor drive system and for providing an idle control signal as long as such a condition is present, which idle control signal is effective to control an operation parameter of said drive system.

It is another object of the present invention to provide an apparatus and method for furnishing an idle control signal in an AC electric motor drive system having a desired level of rotation command when a torque command signal and at least two of a rotation reference signal, an actual rotation signal and a rotation difference signal are less than respective predetermined values.

It is a further object of the present invention to provide an apparatus and method for producing an idle control signal in an AC electric motor drive system having a desired level of torque command when an actual rotation signal and a torque command signal are less than respective predetermined values.

It is another object of the present invention to provide an apparatus and method for delaying the generation of the idle control signal by a predetermined time amount.

These and other objects have been achieved by the present invention.

SUMMARY OF THE INVENTION

A substantially zero rotation and substantially zero torque detector and method is disclosed for an AC electric motor drive system having an AC electric motor producing a rotation in response to an outgoing signal of variable magnitude and frequency. An actual rotation signal is generated and is proportional to the rotation of the AC electric motor. In one embodiment of the drive system, a rotation reference signal proportional to a desired level of rotation is established. A rotation difference signal representative of any difference between the rotation reference signal and the actual rotation signal is produced. A torque command signal representative of a function of the rotation difference signal is generated and is used to produce a frequency control signal and a current control signal. In another embodiment of the drive system, the torque command signal is generated proportional to a desired level of torque. In either embodiment, the outgoing signal is supplied to the motor at a frequency controlled in response to the frequency control signal and at a magnitude varied in accordance with the current control signal.

In the embodiment of the drive system utilizing a desired level of rotation, the substantially zero rotation and substantially zero torque detector and method of the present invention furnishes an idle control signal when the torque command signal and at least two of the rotation reference signal, the actual rotation signal and the rotation difference signal are less than respective predetermined values. In the other embodiment of the drive system utilizing a desired level of torque, the substantially zero rotation and substantially zero torque detector and method of the present invention furnishes an idle control signal when the actual rotation signal and the torque command signal are less than respective predetermined values. The present invention can also include a delay for delaying by a predetermined time amount the generation of the idle control signal, but which also allows generation of the idle control signal to cease immediately after the substantially zero rotation and substantially zero torque condition is no longer present. The idle control signal generated by the detector and method of the present invention can be used effectively to control an operation parameter of the drive system. For example, the idle control signal can be used effectively to vary the frequency and magnitude of the outgoing signal when the drive system is in the substantially zero rotation and substantially zero torque mode.

In the case of the drive system utilizing a desired level of rotation, a preferred embodiment of the detector of the present invention includes circuitry for producing absolute value signals for the torque command signal and at least two of the rotation reference signal, the actual rotation signal, and the rotation difference signal, respectively. Each of these absolute value signals is compared with a reference voltage. An output signal is generated for each of the absolute value signals when the respective absolute value signal is less than the reference voltage. A logic stage generates the idle control signal when each of the absolute value signals causes the generation of a respective output signal.

In the embodiment of the drive system utilizing a desired level of torque, a preferred embodiment of the detector of the present invention is identical to the embodiment discussed above with the exception that respective absolute value signals are produced only for the torque command signal and the actual rotation signal. Thus, the idle control signal is generated by a logic stage when the output signals corresponding to the absolute value versions of the actual rotation signal and torque command signal are each present.

DETAILED DESCRIPTION OF THE INVENTION

Figure 1:
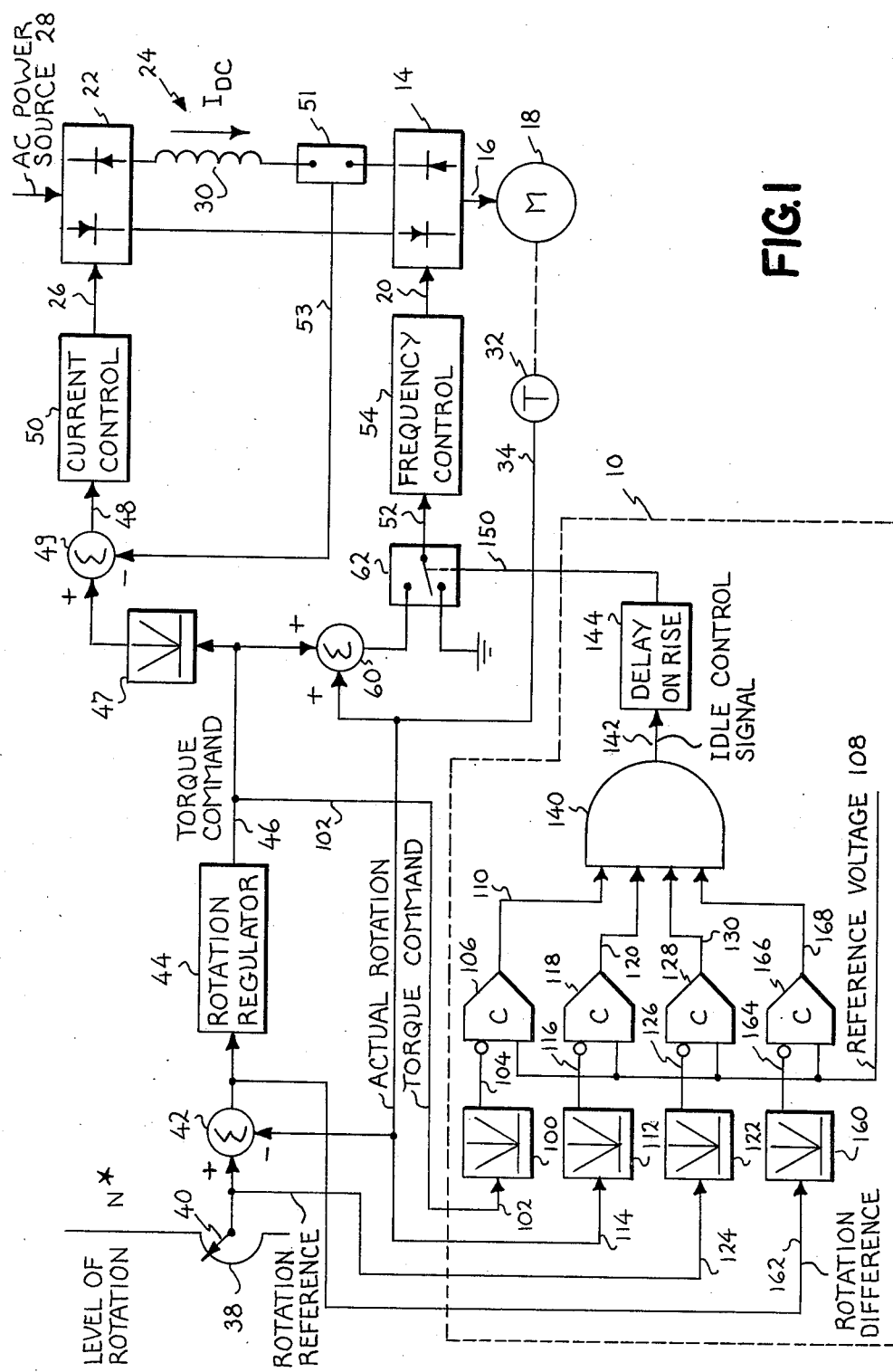
FIG. 1 is a schematic block diagram of a preferred embodiment of the substantially zero rotation and substantially zero torque detector of the present invention utilized in an AC electric motor drive system employing a desired level of rotation.

FIG. 1 is a schematic block diagram of a suitable AC electric motor drive system in which the substantially zero rotation and substantially zero torque detector and method of the present invention can be used. The detector of the present invention is shown in a preferred embodiment within a dashed-line box 10; the circuitry outside box 10 is a conventional AC electric motor drive system employing a desired level of rotation command.

The detector and method of the present invention can be utilized in other types of electric drive systems. The system shown in FIG. 1 is only for purposes of illustration, and is similar to the system disclosed and claimed in U.S. Pat. No. 4,230,979, entitled "Controlled Current Inverter and Motor Control System," to P. M. Espelage et al, issued Oct. 28, 1980, assigned to the assignee of the present invention, and incorporated by reference herein. Another suitable electric drive motor system is shown in A. B. Plunkett, D'Atre, J. D., Lipo, T. A., "Synchronous Control of a Static AC Inductor Motor Drive," *IEEE/IAS Annual Meeting Conference Record*, 1977, pages 609–15.

Referring to FIG. 1, a variable frequency inverter 14 provides an outgoing signal of variable magnitude and frequency via a line 16 to a load, such as AC motor 18. AC motor 18 can be of any suitable type, but preferably is an AC induction motor. The outgoing signal in the drive system shown in FIG. 1 is a drive current.

Inverter 14 can be of any suitable type for converting a DC input signal to a current of variable frequency under control of a frequency control signal on a input line 20. One preferable form for inverter 14 is an autosequentially commutated controlled current inverter having a 6-thyristor bridge, which generates the drive current of variable magnitude and frequency in accordance with the controlled gating of the thyristors.

The DC input current to inverter 14 can be provided by any suitable variable DC current source. One preferred embodiment for the variable DC current source is a converter 22, which supplies variable magnitude DC current via a DC link 24 to the input of inverter 14. Converter 22 converts AC power 28 under control of a current control signal on a line 26 to a DC current of variable magnitude. Converter 22 can be of any suitable type but, most typically, would be a 6-thyristor phase controlled converter whose thyristors are provided with gating pulses in response to the current control signal on line 26.

The DC current of variable magnitude ($I_{DC}$) is provided to inverter 14 via DC link 24. DC link 24 can take any suitable form, but preferably includes an inductor 30 connected in series between converter 22 and inverter 14. Inductor 30 acts as a filter.

Thus, the magnitude of the drive current supplied by inverter 14 to line 16 is controlled by the current control signal supplied to converter 22, and the frequency of the drive current is varied in accordance with the frequency control signal furnished on line 20 to inverter 14.

The electric motor drive system shown in FIG. 1 is a closed loop system having the following feedback paths. The actual rotation produced by motor 18 is sensed and used to generate an actual rotation signal on a line 34 proportional to the mechanical rotation. One suitable form for generating the actual rotation signal is a DC tachometer 32. Another approach for generating the actual rotation signal is by sensing the frequency of the drive current, whereby the actual rotation signal is proportional to the frequency level thereof. Furthermore, other approaches for generating the actual rotation signal are contemplated by this invention.

A desired level of rotation is used to establish a rotation reference signal proportional thereto. The desired level of rotation can be furnished from either a system or user command; and most typically is in the form of a rotation user command from an operator settable rheostat 38 having a wiper arm 40 connected to a user or operator rotation control lever (not shown).

The rotation reference signal from wiper arm 40 is provided to a first input of a summing junction 42. The actual rotation signal is negatively fed back and provided to a second input of summing junction 42. The output of summing junction 42 is a rotation difference signal, which is representative of any difference between the rotation reference signal and the actual rotation signal and is provided to the input of a rotation regulator 44. Rotation regulator 44 can be of any suitable type to generate on a line 46 a torque command signal as a function of the rotation difference signal. One suitable form for rotation regulator 44 is an operational amplifier configured to operate as a gain amplifier having, for example, a transfer function of k (1+st)/s, where s is a LaPlace operator, t is a time constant, and k is a gain constant.

The torque command signal is applied via line 46 to the input of an absolute value stage 47 of conventional design. The absolute value version of the torque command signal at the output of absolute value stage 47 is applied to the first input of a summer 49 of conventional design. A shunt 51 is connected to sense the magnitude of the DC current ($I_{DC}$) through inductor 30 connected to inverter 14. Shunt 51 provides on a line 53 a signal indicative of this magnitude level. The signal on line 53 is negatively fed back and provided to a second input of summer 49. The output of summer 49 provides to an input 48 of a current control stage 50 a signal representative of the difference between the absolute value version of the torque command signal and the signal indicative of the magnitude of the DC current ($I_{DC}$).

Current control stage 50 can be of any suitable type for generating the current control signal on line 26 in accordance with the signal at input 48. One suitable form for current control stage 50 is that of a ramp and pedestal gating control of conventional design.

The torque command signal on line 46 is also applied to the first input of a summer 60 of conventional design. The actual rotation signal is positively fed back and provided to a second input of summer 60. The output of summer 60, which is a signal proportional to the sum of the torque command signal and the actual rotation signal, is provided to the input of an electronic switch 62. Switch 62 normally connects the input to its output, but is adopted to connect the input to electrical ground when a frequency command signal or an idle control signal is provided to its switching input by a line 150. Electronic switch 62 can be of any suitable type, such as bipolar or field effect transistor switch or an electromechanical relay.

The output of electronic switch 62 is connected to an input 52 of a frequency control stage 54. Frequency control stage 54 can be of any suitable type of generating the frequency control signal as a function of the signal proportional to the sum of the torque command signal and the actual rotation signal. The frequency control signal is provided to inverter 14 via line 20. One suitable form for frequency control stage 54 is that of a voltage controlled oscillator and a non-recirculating shift register disclosed and claimed in U.S. patent application Ser. No. 032,895, entitled "Inverter Power Conversion System Having Improved Control Scheme," to Loren H. Walker et al., filed on the day of the present application, assigned to the assignee of the present application, and incorporated herein by reference. Another suitable form for frequency control stage 54 is that of a voltage controlled oscillator and a ring counter.

In known frequency controls such as that shown generally at 54, including more sophisticated types utilizing means for measuring motor flux or flux angle, there is a tendency for the control to generate spurious output signals which would cause the inverter 14 to provide other than the desired zero frequency signal to the motor. The illustration of FIG. 1, showing the ground connection in response to the idle control signal on line 150 is illustrative of a means for locking the frequency control and hence the inverter 14 to zero frequency outputs, thus avoiding the problems associated with such spurious signals.

Figure 2:
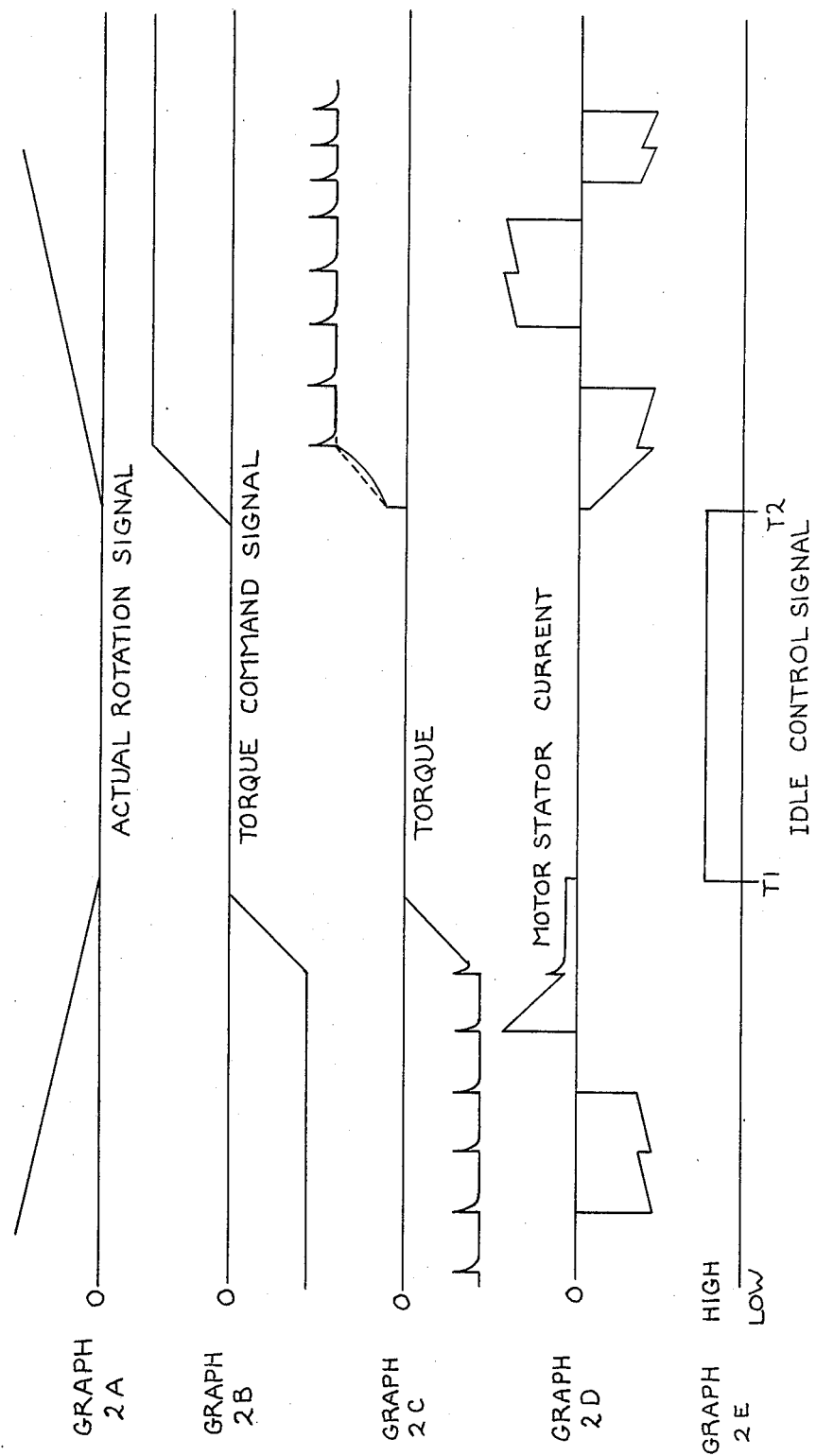
FIG. 2 includes five separate graphs (2A-2E) having identical time periods on horizontal axes and plotting on vertical axes, respectively, the levels of the actual rotation signal, the torque command signal, the torque, the motor stator current, and the idle control signal as the drive system enters, stops, and then exits the substantially zero rotation and substantially zero torque mode.

The conventional drive system shown in FIG. 1 allows the mechanical rotation and torque generated by AC induction motor 18 to be controlled in accordance with the desired level of rotation. FIG. 2 plots on five separate graphs important drive system parameters as the drive current causes motor 18 to enter, stop, and exit the substantially zero rotation and substantially zero torque mode of operation.

The horizontal axis of each of the graphs 2A–2E represents an identical time period in the drive system operation, where the time period to the left of symbol T1 represents the drive system supplying drive current to motor 18 causing it to enter the substantially zero rotation and substantially zero torque mode of operation. The time period between symbols T1 and T2 represents the time period in which the drive system supplies drive current causing motor 18 to remain in the substantially zero rotation and substantially zero torque mode; the time period to the right of symbol T2 represents the time period where the drive system supplies drive current causing motor 18 to exit and accelerate out of the substantially zero rotation and substantially zero torque mode of operation.

Graph 2A plots on the vertical axis the level of the actual rotation signal. It is seen that the actual rotation signal is approximately zero when the drive system causes motor 18 to stop in the substantially zero rotation and substantially zero torque mode.

Graph 2B plots on the vertical axis the level of the torque command signal, which is approximately zero when the drive system causes motor 18 to stop in the substantially zero rotation and substantially zero torque mode.

Graph 2C plots on the vertical axis the level of the torque generated by motor 18, which is approximately zero when the drive system causes motor 18 to stop in the substantially zero rotation and substantially zero torque mode.

Graph 2D plots on the vertical axis the level of the motor stator current for one winding of polyphase motor 18. Graph 2D shows that this stator current is at zero frequency and has a substantially zero magnitude level when motor 18 is in the substantially zero rotation and substantially zero torque mode.

The substantially zero rotation and substantially zero torque detector and method of the present invention is now described.

It is desirable for system control purposes that an idle control signal be furnished only when the system is in the substantially zero rotation and substantially zero torque most. In the case of a drive system utilizing a desired level of rotation, the detector and method of the present invention furnishes the idle control signal when the torque command signal and at least two of the rotation reference signal, actual rotation signal, and rotation difference signal are less than respective predetermined values. Alternately, in the case of a drive system utilizing a desired level of torque, the detector and method of the present invention furnishes the idle control signal when the actual rotation signal and the torque command signal are less than respective predetermined values.

The drive system can exit the substantially zero rotation and substantially zero torque mode as a result of one of three conditions. First, the desired level of rotation can be changed from the substantially zero value, as, for example, when the user no longer desires zero rotation. This will cause the rotation reference signal to be greater than the predetermined value. Secondly, the actual rotation can no longer be substantially zero, which would occur when the rotor starts to turn. This would cause the actual rotation signal to become greater than the predetermined value. The third occurrence is the generation of a torque command signal above a predetermined level, which would occur when the motor is required to produce a torque greater than a substantially zero value. When any of these three conditions occur in a drive system employing a desired level of rotation, the idle control signal is no longer generated by the detector and method of the present invention.

Graph 2E plots on the vertical axis the presence of the idle control signal. The idle control signal is in the low state when the drive system is not in the substantially zero rotation and substantially zero torque mode, and goes to the high state when the system is in this mode. The idle control signal is returned immediately to the low state when the drive system exits the mode. It should be understood, however, that the idle control signal could normally be in the high state when the system is not in the substantially zero rotation and substantially zero torque mode, and could be driven to the low state when the system is in this mode.

Referring again to FIG. 1, a preferred embodiment of the detector of the present invention is shown for a drive system employing a desired level of rotation. An absolute magnitude circuit 100 has an input connected via line 102 to the torque command signal on line 46. Absolute magnitude circuit 100 can be of any suitable type for providing on an output line 104 an absolute magnitude version of the torque command signal.

The absolute magnitude version of the torque command signal is provided to a first input of a voltage comparator 106, whose second input is connected to a source of reference voltage 108. The level of the reference voltage corresponds to the respective predetermined value below which the absolute magnitude version of the torque command signal must be at in order for the system to be in the substantially zero rotation and substantially zero torque mode. Reference voltage souce 108 can be of any suitable type for generating a reference voltage at the predetermined value.

Voltage comparator 106 can be of any suitable form for furnishing a first output signal on line 110 when the absolute magnitude version of the torque command signal is less than the level of the reference voltage source 108. One suitable form for voltage comparator 106 is that of an operational amplifier connection in the voltage comparison mode.

The input of a second absolute magnitude circuit 112 is connected via a line 114 to the actual rotation signal on line 34 for providing an absolute magnitude version of the actual rotation signal on an output line 116. Absolute magnitude stage 112 can take any suitable form. The absolute magnitude version of the actual rotation signal on line 116 is provided to a first input of a voltage comparator 118. The second input of comparator 118 is connected to the voltage reference source 108, and provides at an output 120 a second output signal when the magnitude of the absolute magnitude version of the actual rotation signal is less than the level of the voltage reference source 108.

The input of a third absolute magnitude circuit 122 is connected via an input line 124 to the rotation reference signal at wiper arm 40. Absolute magnitude circuit 122 provides at an output line 126 an absolute magnitude version of the rotation reference signal. The absolute magnitude version of the rotation reference signal on output line 126 is supplied to a first input of a voltage comparator 128, whose second input is connected to the reference voltage source 108. Comparator 128 provides on an output line 130 a third output signal when the absolute magnitude version of the rotation reference signal is less than the level of the reference voltage signal.

The input of a fourth absolute magnitude circuit 160 is connected via an input line 162 to the rotation difference signal at the output of summer 42. Absolute magnitude circuit 160 provides at an output line 164 an absolute magnitude version of the rotation reference signal. The absolute magnitude version of the rotation reference signal on output line 164 is supplied to a first input of a voltage comparator 166, whose second input is connected to the reference voltage source 108. Comparator 168 provides on an output line 166 a fourth output signal when the absolute magnitude version of the rotation difference signal is less than the level of the reference voltage signal.

It should be understood that the voltage comparators 106, 118, 128 and 166 could each be connected to a different reference signal source providing reference signals of different levels. The use of different reference sources is one way to provide for different predetermined levels below which the torque command signal and at least two of the rotation reference signal, the actual rotation signal, and the rotation difference signal must be in order for the idle control signal to be furnished by the detector and method of the present invention.

As shown, the output signals from the voltage comparators 106, 118, 128, and 166 on lines 110, 120, 130 and 168, respectively, are applied to a logic circuit 140, which furnishes the idle control signal only when the first control signal and two of the second to fourth control signals are present. It should be understood that the detector and method of the present invention can also be configured to provide the idle control signal when each of the first to fourth control signals are present. Normally, only two of the second to fourth control signals are used because the information in the unused control signal is present in the two control signals that are used. Logic circuit 140 can be of any suitable type, such as an AND gate array. The output from the logic circuit 140 on line 142 is the idle control signal, and indicates that the drive system is in the substantially zero rotation and substantially zero torque mode of operation.

In order to stabilize the drive system against transients, a delay of predetermined time amount can be introduced before furnishing of the idle control signal to prevent the idle control signal from being generated transiently when the drive system momentarily passes through the substantially zero rotation and substantially zero torque mode. This delay of a predetermined time amount can be produced by applying the idle control signal on line 142 to a delay stage 144. Delay stage 144 has a delay on rise and no delay on fall, for example, 0.1 second on rise. Delay stage 144 can be of any suitable design, for example, a one-shot and a gate.

The idle control signal can be used effectively to control an operation parameter of the drive system when the system is in the substantially zero rotation and substantially zero torque mode. As shown in FIG. 1, one suitable use for the idle control signal is to provide it via line 150 to the switching input of electronic switch 62, effectively causing the frequency of the drive current provided by inverter 14 to motor 18 to be driven substantially to zero when the substantially zero rotation and substantially zero torque condition occur.

Other suitable uses for the idle control signal are found in U.S. patent application Ser. No. 032,899, entitled "Apparatus and Method For High Slip Operation of an AC Electric Motor at Substantially Zero Rotation and Substantially Zero Torque," to Loren H. Walker and John H. Cutler, filed on the same day as the filing of this application, assigned to the assignee of the present invention, and incorporated herein by reference. Another application for the idle control signal is found in the previously mentioned U.S. patent application Ser. No. 032,856. It should be understood, however, that the idle control signal can be used to control any operation parameter or function when the drive system is in the substantially zero rotation and substantially zero torque mode.

Figure 3:
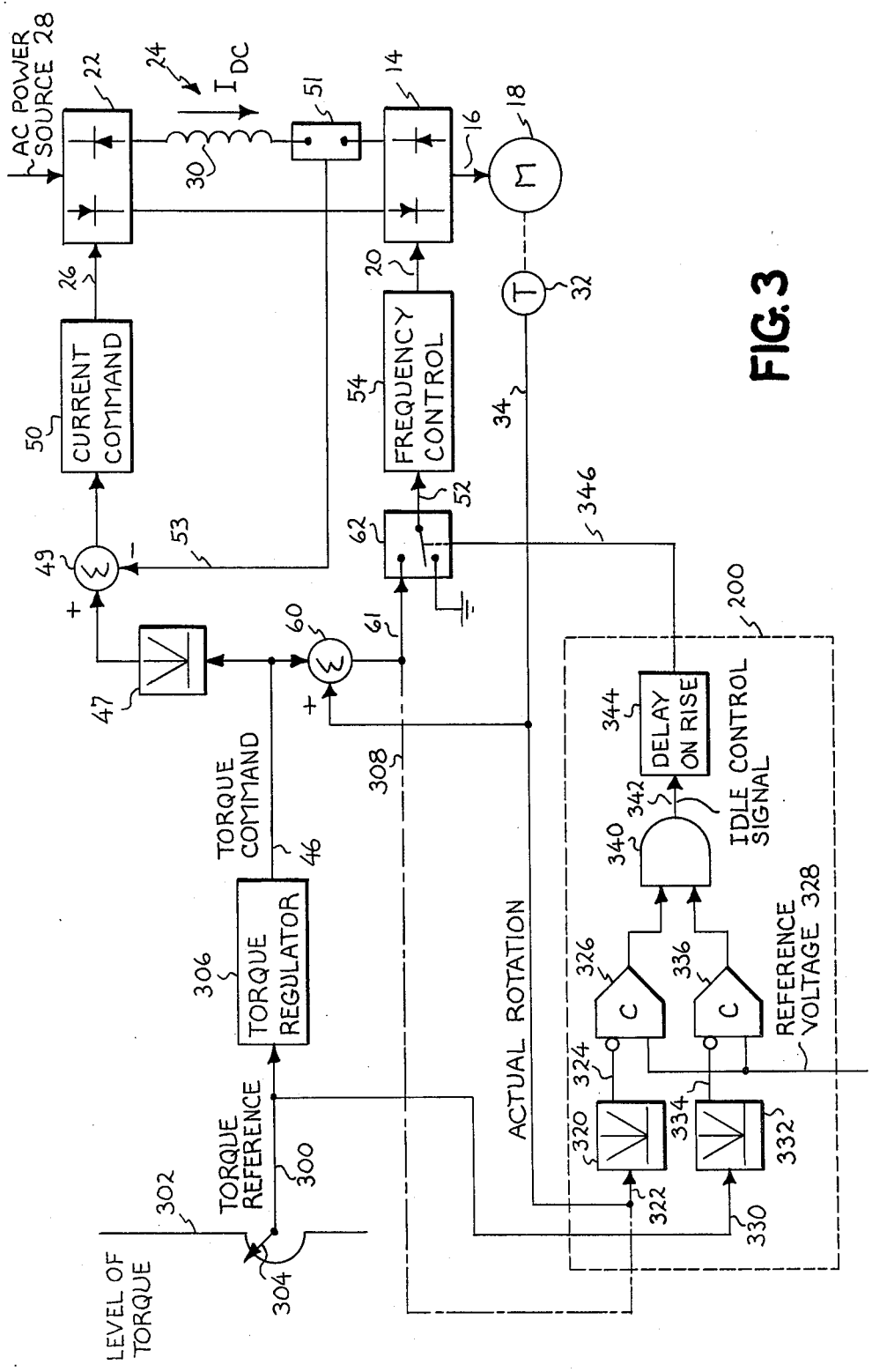
FIG. 3 is a schematic block diagram of a preferred embodiment of the substantially zero rotation and substantially zero torque detector of the present invention utilized in an AC electric motor drive system employing a desired level of torque.

Referring to FIG. 3, a preferred embodiment of the substantially zero rotation and torque detector of the present invention for use in an AC electric motor drive system employing a desired level of torque command is shown within a dashed-line box 200. The conventional AC electric motor drive system employing a desired level of torque command shown in FIG. 3 is outside of the dashed-line box 200, and is similar to the drive system disclosed in the P. M. Espelage U.S. Pat. 4,230,919, discussed above. Like numbers in FIGS. 1 and 3 correspond to identical components; only different components are discussed herein.

A torque reference signal proportional to a desired level of torque is provided on a line 300. This torque reference signal can be provided by the drive system, or can be furnished by an operator settable rheostat 302 having a wiper arm 304. The position of the wiper arm 304 corresponds to the desired level of torque indicated by the position of a user torque lever (not shown).

The torque reference signal is provided as an input of a torque regulator 306, which generates the torque command signal on line 46 as a function of the torque reference signal. The torque regulator 306 can be of any suitable type to generate the torque command signal in accordance with the torque reference signal. One suitable form for torque regulator 306 is an operational amplifier of conventional design configured to operate as an amplifier exhibiting a suitable gain. The remaining components of the conventional drive system shown in FIG. 3 correspond to the like numbered components of the conventional drive system shown in FIG. 1.

In the drive system employing a desired level of torque, the idle control signal is furnished by detector and method of the present invention when the actual rotation signal and the torque reference signal are less than respective predetermined values. The predetermined values can be equal or different for the torque reference signal and the actual rotation signal, but the values indicate when the drive system is in the substantially zero rotation and substantially zero torque mode.

Referring again to the detector and method of the present invention shown in FIG. 3, the actual rotation signal is applied via a line 322 to an absolute magnitude circuit 320. An alternate configuration shown on FIG. 3 derives the signal on line 322 from that at line 61 via dot-dash line 308. The signal at line 61 is normally proportional to actual frequency rather than actual rotation. Absolute magnitude circuit 320 can be any suitable type for providing on an output line 324 an absolute magnitude version of the actual rotation signal.

The absolute magnitude version of the actual rotation signal is applied to the first input of a voltage comparator 326. A second input of voltage comparator 326 is connected to a reference voltage source 328, which provides a reference signal at a value equal to the predetermined value. Voltage comparator 326 provides a second output signal when the absolute magnitude version of the actual rotation signal is less than the predetermined value. Voltage comparator 326 can be of any suitable type, for example, an operational amplifier connected in the voltage comparison mode.

An input line 330 of an absolute magnitude circuit 332 is connected to the torque reference signal present on line 300. Absolute magnitude circuit 332 provides an absolute magnitude version of the torque reference signal on a line 334 connected to the first input of a comparator 336. The second input of the voltage comparator 336 is connected to the voltage reference source 328. Voltage comparator 336 generates a first output signal when the value of the absolute magnitude version of the torque reference signal is less than the reference voltage signal furnished by the reference voltage source 328. Voltage comparator 336 can be of any suitable type, for example, an operational amplifier connected in the voltage comparison mode.

The first output signal from comparator 336 and the second output signal from voltage comparator 326 are each applied to a logic circuit 340, which provides the idle control signal as an output on line 342 when both of the two output signals are in the high state. Logic stage 340 can be of any suitable type for providing the idle control signal when both of the two output signals are in the high state, for example, an AND gate.

The idle control signal present on the output line 342 can be used effectively to control any operation parameter or function when the drive system is in the substantially zero rotation and substantially zero torque mode. For example, the idle control signal can be provided to the switching input of electronic switch 62 to cause the frequency of the drive current provided by inverter 14 to motor 18 to be driven substantially to zero when the substantially zero rotation and substantially zero torque condition occurs. Additional representative uses are presented above in connection with the explanation of the embodiment of the torque detector and method incorporated into the system of FIG. 1.

As is also the case with the detector and method of the present invention shown in FIG. 1, the generation of the idle control signal for line 342 can be delayed by a delay stage 344 for a predetermined amount of time so as to prevent the generation of the idle control signal when the drive system transiently passes through the substantially zero rotation and torque mode. Delay stage 344 provides the idle control signal on line 342 to an output line 346 after the predetermined time period has lapsed, for example, 0.1 second. Delay stage 344 can take any suitable form, for example, a one-shot and a gate. It preferably exhibits a delay on rise (e.g., approximately 0.1 second) and no delay on fall to cause the idle control signal to drop immediately to the low level when the system is no longer in the substantially zero rotation and torque mode.

It should be understood that the embodiments of the substantially zero rotation and substantially zero torque detector and method of the present invention shown in FIGS. 1 and 3 are only illustrative. Other circuitry can be used to furnish an idle control signal when the drive system is in a substantially zero rotation and substantially zero torque mode.

While there have been shown and described what are at present considered to be the preferred embodiments of the present invention, modifications thereto will readily occur to those skilled in the art. It is not desired, therefore, that the invention be limited to the specific arrangements shown and described, and it is intended to cover in the appended claims all such modifications as fall within the true spirit and scope of the invention.

What is claimed is:

1. A substantially zero rotation and substantially zero torque apparatus for an AC electric motor drive system having an AC electric motor producing a rotation in response to an outgoing signal of variable magnitude and frequency, said apparatus comprising:

(a) means for establishing a rotation reference signal proportional to a desired level of rotation;
   (b) means for generating an actual rotation signal proportional to said rotation;
   (c) means for generating a rotation difference signal representative of any difference between said rotation reference signal and said actual rotation signal;
   (d) means for supplying a torque command signal as a function of said rotation difference signal and for producing a frequency control signal and a current control signal as functions of said torque command signal;
   (e) means for supplying to said motor said outgoing signal at a frequency controlled in response to said frequency control signal and at a magnitude varied in accordance with said current control signal; and
   (f) means for furnishing an idle control signal when said torque command signal and at least two of said rotation reference signal, said actual rotation signal, and said rotation difference signal are less than respective predetermined values, whereby said idle control signal indicates that the drive system is in a substantially zero rotation and substantially zero torque state and is effective to control an operation parameter of said drive system.

2. The apparatus of claim 1, wherein said means for generating an actual rotation signal generates an actual rotation signal proportional to the frequency of said outgoing signal.

3. The apparatus of claim 1, wherein said outgoing signal is a drive current.

4. The apparatus of claim 1, wherein said means for furnishing an idle control signal further includes means for delaying by a predetermined time amount generation of said idle control signal.

5. The apparatus of claim 4, wherein said predetermined time amount is approximately 0.1 second.

6. The apparatus of claim 1, wherein said means for furnishing said idle control signal includes:

(a) means for generating a plurality of respective reference voltages;
   (b) first absolute value means for producing an output signal representative of the absolute value of said torque command signal;
   (c) first comparator means for furnishing a first output signal when a respective reference voltage is greater than said output signal from said first absolute value means;
   (d) second absolute value means for producing an output signal representative of the absolute value of said actual rotation signal;
   (e) second comparator means for furnishing a second output signal when a respective reference voltage is greater than said output signal from said second absolute value means;
   (f) third absolute value means for producing an output signal representative of the absolute value of said rotation reference signal;
   (g) third comparator means for furnishing a third output signal when a respective reference voltage is greater than said output signal from said third absolute value means;
   (h) fourth absolute value means for producing an output signal representative of the absolute value of said rotation difference signal;
   (i) fourth comparator means for furnishing a fourth output signal when a respective reference voltage is greater than said output signal from said fourth absolute value means; and (j) logic means for providing said idle control signal when said first and at least two of said second, third and fourth output signals are present.

7. The apparatus of claim 6, wherein said plurality of respective reference voltages are substantially equal.

8. The apparatus of claim 1, wherein said means for establishing a rotation reference signal establishes a torque reference signal proportional to a desired level of torque,
wherein said means for generating a rotation difference signal is absent,
wherein said means for supplying a torque command signal supplies said torque command signal as a function of said torque reference signal and produces said frequency control signal and said current control signal as functions of said torque command signal, and
wherein said means for furnishing an idle control signal when said torque reference signal and said actual rotation signal are less than respective predetermined values.

9. The apparatus of claim 8, wherein said means for generating an actual rotation signal generates an actual rotation signal proportional to the frequency of said outgoing signal.

10. The apparatus of claim 8, wherein said outgoing signal is a drive current.

11. The apparatus of claim 8, wherein said means for furnishing an idle control signal further includes means for delaying by a predetermined time amount generation of said idle control signal.

12. The apparatus of claim 11, wherein said predetermined time amount is approximately 0.1 second.

13. The apparatus of claim 8, wherein said means for furnishing said idle control signal includes:
(a) means for generating a plurality of respective reference voltages;
(b) first absolute value means for producing an output signal representative of the absolute value of said torque reference signal;
(c) first comparator means for furnishing a first output signal when a respective reference voltage is greater than said output signal from said first absolute value means;
(d) second absolute value means for producing an output signal representative of the absolute value of said actual rotation signal;
(e) second comparator means for furnishing a second output signal when a respective reference voltage is greater than said output signal from said second absolute value means; and
(f) logic means for providing said idle control signal when said first and second output signals are present.

14. The apparatus of claim 13, wherein said plurality of respective reference voltages are substantially equal.

15. The apparatus of claim 1, wherein said means for supplying to said motor said outgoing signal comprises:
(a) a variable DC current source for providing a DC output current having a magnitude varied in response to said current control signal;
(b) an inverter for supplying a drive current to said motor at a frequency controlled as a function of said frequency control signal; and
(c) link circuit means including an inductor for connecting said DC current source to said inverter.

16. The apparatus of claim 8, wherein said means for supplying to said motor said outgoing signal comprises:
(a) a variable DC current source for providing a DC output current having a magnitude varied in response to said current control signal;
(b) an inverter for supplying a drive current to said motor at a frequency controlled as a function of said frequency control signal; and
(c) link circuit means including an inductor for connecting said DC current source to said inverter.

17. A substantially zero rotation and substantially zero torque apparatus for an AC electric motor drive system having an AC electric motor producing a rotation in response to a drive current of variable magnitude and frequency, said apparatus comprising:
(a) means for establishing a torque reference signal proportional to a desired level of torque;
(b) means for generating an actual rotation signal proportional to said rotation;
(c) means for generating a torque command signal as a function of said torque reference signal, and for producing a frequency control signal and a current control signal as functions of said torque command signal;
(d) means for supplying to said motor said drive current at a frequency controlled in response to said frequency control signal and at a magnitude varied in accordance with said current control signal; and
(e) means for furnishing an idle control signal when said actual rotation signal and said torque reference signal are less than respective predetermined values, whereby said idle control signal indicates that the drive system is in a substantially zero rotation and substantially zero torque state and is effective to control an operation parameter of said drive system.

18. A method of furnishing an idle control signal in an AC electric motor drive system having an AC electric motor producing a rotation in response to an outgoing signal of variable magnitude and frequency comprising the steps of:
(a) establishing a rotation reference signal proportional to a desired level of rotation;
(b) generating an actual rotation signal proportional to said rotation;
(c) generating a rotation difference signal representative of any difference between said rotation reference signal and said actual rotation signal;
(d) supplying a torque command signal as a function of said rotation difference signal;
(e) producing a frequency control signal and a current control signal as functions of said torque command signal;
(f) supplying to said motor said outgoing signal at a frequency controlled in response to said frequency control signal and at a magnitude varied in accordance with said current control signal; and
(g) furnishing an idle control signal when said torque command signal and at last two of said rotation reference signal, said actual rotation signal, and said rotation difference signal are less than respective predetermined values, whereby said idle control signal indicates that the drive system is in a substantially zero rotation and substantially zero torque state and is effective to control an operation parameter of said drive system.

19. A method of furnishing an idle control signal in an AC electric motor drive system having an AC electric motor producing a rotation in response to a drive current of variable magnitude and frequency comprising the steps of:

(a) establishing a rotation reference signal proportional to a desired value of rotation;

(b) generating an actual rotation signal proportional to said frequency of said drive current;

(c) generating a rotation difference signal representative of any difference between said rotation reference signal and said actual rotation signal;

(d) supplying a torque command signal as a function of said rotation difference signal;

(e) producing a frequency control signal and a current control signal as functions of said torque command signal;

(f) providing from a variable DC current source a DC output current having a magnitude varied in response to said current control signal;

(g) supplying from an inverter said drive current to said motor at a frequency controlled as a function of said frequency control signal;

(h) providing link circuit means including an inductor for connecting said DC current source to said inverter via a link circuit including an inductor; and (i) generating an idle control signal when said torque command signal and at least two of said rotation reference signal, said actual rotation signal, and said rotation difference signal are less than respective predetermined values, whereby said idle control signal indicates that the system is in the substantially zero rotation and substantially zero torque mode and is effective to control an operation parameter of said drive system.

20. A method of furnishing an idle control signal in an AC electric motor drive system having an AC electric motor producing a rotation in response to an outgoing signal of variable magnitude and frequency comprising the steps of:

(a) establishing a torque reference signal proportional to a desired level of torque;

(b) generating an actual rotation signal proportional to said rotation;

(c) generating a torque command signal as a function of said torque reference signal;

(d) producing a frequency control signal and a current control signal as functions of said torque command signal;

(e) supplying to said motor said outgoing signal at a frequency controlled in response to said frequency control signal and at a magnitude varied in accordance with said current control signal; and (f) furnishing an idle control signal when said actual rotation signal and said torque reference signal are less than respective predetermined values, whereby said idle control signal indicates that the drive system is in a substantially zero rotation and substantially zero torque state and is effective to control an operation parameter of said drive system.

21. A method of furnishing an idle control signal in an AC electric motor drive system having an AC electric motor producing a rotation in response to a drive current of variable magnitude and frequency comprising the steps of:

(a) establishing a torque reference signal proportional to a desired value of torque;

(b) generating an actual rotation signal proportional to said rotation;

(c) generating a torque command signal as a function of said torque reference signal;

(d) producing a frequency control signal and a current control signal as functions of said torque command signal;

(e) providing from a variable DC source a DC output current having a magnitude varied in response to said current control signal;

(f) supplying from an inverter said drive current to said motor at a frequency controlled as a function of said frequency control signal;

(g) connecting using a link circuit including an inductor, said DC current source to said inverter; and (h) generating an idle control signal when said actual rotation signal and said torque reference signal are less than respective predetermined values, whereby said idle control signal indicates that the system is in the substantially zero rotation and substantially zero torque mode and is effective to control an operation parameter of said drive system.

* * * * *